(12) United States Patent
Knoth

(10) Patent No.: US 7,873,820 B2
(45) Date of Patent: Jan. 18, 2011

(54) PROCESSOR UTILIZING A LOOP BUFFER TO REDUCE POWER CONSUMPTION

(75) Inventor: Matthias Knoth, San Jose, CA (US)

(73) Assignee: MIPS Technologies, Inc., Sunnyvale, CA (US)

(*) Notice: Subject to any disclaimer, the term of this patent is extended or adjusted under 35 U.S.C. 154(b) by 0 days.

(21) Appl. No.: 11/272,718

(22) Filed: Nov. 15, 2005

(65) Prior Publication Data

US 2007/0113057 A1 May 17, 2007

(51) Int. Cl.
- G06F 7/38 (2006.01)
- G06F 9/00 (2006.01)
- G06F 9/44 (2006.01)
- G06F 15/00 (2006.01)

(52) U.S. Cl. .................................................. 712/241
(58) Field of Classification Search .................. 712/241
See application file for complete search history.

(56) References Cited

U.S. PATENT DOCUMENTS

| 5,091,851 | A |   | 2/1992  | Shelton et al. |
| 5,325,511 | A |   | 6/1994  | Collins et al. |
| 5,493,667 | A |   | 2/1996  | Huck et al. |
| 5,568,442 | A |   | 10/1996 | Kowalczyk |
| 5,734,881 | A |   | 3/1998  | White et al. |
| 5,761,715 | A |   | 6/1998  | Takahashi |
| 5,764,999 | A |   | 6/1998  | Wilcox et al. |
| 5,809,326 | A | * | 9/1998  | Nogami ................ 712/32 |
| 5,822,760 | A |   | 10/1998 | Yoshizawa et al. |
| 5,848,433 | A |   | 12/1998 | Tran et al. |
| 5,966,734 | A |   | 10/1999 | Mohamed et al. |

(Continued)

FOREIGN PATENT DOCUMENTS

CN   1397876 A   2/2003

(Continued)

OTHER PUBLICATIONS

Bellas, Hajj, Polychronopoulos & Stamoulis; Architectural and Compiler Techniques for Energy Reduction in High-Performance Microprocessors; Jun. 2000; IEEE Computer Society; IEEE Transactions on VLSI Systems, vol. 8, No. 3, Jun. 2000; pp. 317-326.*

(Continued)

Primary Examiner—Eddie P Chan
Assistant Examiner—Corey Faherty
(74) Attorney, Agent, or Firm—Sterne, Kessler, Goldstein & Fox P.L.L.C.

(57) ABSTRACT

The present invention provides processing systems, apparatuses, and methods that reduce power consumption with the use of a loop buffer. In an embodiment, an instruction fetch unit of a processor initially provides instructions from an instruction cache to an execution unit of the processor. While instructions are provided from the instruction cache to the execution unit, instructions forming a loop are stored in a loop buffer. When a loop stored in the loop buffer is being iterated, the instruction cache is disabled to reduce power consumption and instructions are provided to the execution unit from the loop buffer. When the loop is exited, the instruction cache is re-enabled and instructions are provided to the execution unit from the instruction cache.

21 Claims, 4 Drawing Sheets

U.S. PATENT DOCUMENTS

| | | | |
|---|---|---|---|
| 6,044,478 A | 3/2000 | Green | |
| 6,076,159 A | 6/2000 | Fleck et al. | |
| 6,085,315 A | 7/2000 | Fleck et al. | |
| 6,167,536 A * | 12/2000 | Mann | 714/45 |
| 6,185,657 B1 | 2/2001 | Moyer | |
| 6,430,655 B1 | 8/2002 | Courtright et al. | |
| 6,477,639 B1 | 11/2002 | Krishnan et al. | |
| 6,505,285 B1 | 1/2003 | Rabinovici et al. | |
| 6,546,477 B1 | 4/2003 | Russo et al. | |
| 6,557,127 B1 | 4/2003 | Adams et al. | |
| 6,757,817 B1 | 6/2004 | Booth | |
| 6,836,833 B1 | 12/2004 | Kinter et al. | |
| 7,496,771 B2 | 2/2009 | Knoth | |
| 7,562,191 B2 | 7/2009 | Knoth | |
| 2002/0087900 A1 | 7/2002 | Homewood et al. | |
| 2002/0188834 A1 | 12/2002 | McDonald et al. | |
| 2003/0074546 A1* | 4/2003 | Hiraki et al. | 712/241 |
| 2004/0024968 A1 | 2/2004 | Lesartre et al. | |
| 2004/0193858 A1 | 9/2004 | Ahmad et al. | |
| 2005/0044429 A1 | 2/2005 | Gaskins et al. | |
| 2005/0102483 A1 | 5/2005 | Kinter et al. | |
| 2005/0246499 A1 | 11/2005 | Saida et al. | |
| 2007/0113013 A1 | 5/2007 | Knoth | |
| 2007/0113050 A1 | 5/2007 | Knoth | |
| 2009/0132841 A1 | 5/2009 | Knoth | |

FOREIGN PATENT DOCUMENTS

| | | | |
|---|---|---|---|
| GB | 2 304 215 A | 3/1997 | |

OTHER PUBLICATIONS

Pierce & Mudge; Wrong-Path Instruction Prefetching; 1996; IEEE Computer Society; 29th International Symposium on Microarchitecture; pp. 165-175.*

Fukuoka, Iijima, Hamada, Numa & Tada; Leakage Power Reduction for Clock Gating Scheme on PD-SOI; May 2004; IEEE Computer Society; International Symposium on Circuits and Systems—2004; pp. 613-616.*

Solomon, Mendelson, Orenstien, Almog & Ronen; Micro-Operation Cache: A Power Aware Frontend for Variable Instruction Length ISA; Aug. 2001; 2001 Symposium on Low Power Electronics and Design; pp. 4-9.*

Cotterell & Vahid; Tuning of Loop Cache Architectures to Programs in Embedded System Design; Oct. 2002; ISSS'02.*

Lee, Moyer & Arends; Instruction Fetch Energy Reduction Using Loop Caches for Embedded Applications with Small Tight Loops; 1999; ISLPED'99; pp. 267-269.*

Lee et al.; Instruction Fetch Energy Reduction Using Loop Caches for Embedded Applications with Small Tight Loops; 1999; ISLPED '99.*

Intel Architecture Software Developer's Manual—vol. 2: Instruction Set Reference, Intel. Corporation, pp. 3-278 and 3-279 (1997).

Watts, C. et al., "ARM Intelligent Energy Manager Future Evolution," paper slide presentation distributed at the ARM Developers' Conference '04, 34 sheets (Oct. 2004).

Kandemir, M. et al., "Dynamic Management of Scratch-Pad Memory Space," *Proceedings of the 38th Design Automation Conference*, ACM, Las Vegas, Nevada, pp. 690-695 (Jun. 2001).

Panda, P. et al., "Data Memory Organization and Optimizations in Application-Specific Systems," *IEEE Design & Test of Computers*, IEEE, pp. 56-68 (May 2001).

Kandemir, M. et al., "Exploiting Shared Scratch Pad Memory Space in Embedded Multiprocessor Systems," *Proceedings of the 39th Design Automation Conference*, ACM, New Orleans, Louisiana, pp. 219-224 (Jun. 2002).

Kandemir, M. et al., "Exploiting Scratch Pad Memory Using Presburger Formulas," *Proceedings of ISSS '01*, ACM, Montreal, Quebec, Canada, pp. 7-12 (Oct. 2001).

Panda, P. et al., "Efficient Utilization of Scratch-Pad Memory in Embedded Processor Applications," *Proceedings of the European Design & Test Conference ED&TC 97*, IEEE, Paris France, pp. 7-11 (Mar. 1997).

Banakar, R. et al., "Scratchpad Memory: A Design Alternative for Cache On-chip memory in Embedded Systems," *Proceedings of CODES '02*, ACM, Estes Park, Colorado, pp. 73-78 (May 2002).

ADSP-21535 Blackfin™ DSP Brochure, Analog Devices, Inc., 4 pages (2001).

Nass, R., "Latest DSPs Poised to Drive 3G Revolution," *Portable Design* 8(9):26, 27, 28, 32, and 34, PennWell Corporation, Fair Lawn, New Jersey (Sep. 2001).

Intel® StrongARM® SA-1100 Microprocessor Developer's Manual, Intel. Corporation, pp. i-xix, 1-1 through 1-7, 2-1 through 2-8, and 6-1 through 6-7 (Aug. 1999).

Courtright, D., "Introducing: The MIPS32™ 4Kc™ and MIPS32™ 4Kp™ Processor Cores 'Jade'," paper slide presentation distributed at the Embedded Microprocessor Forum, pp. 1-25 (May 1999).

Krewell, Kevin, "Intel Looks to Core for Success", Microprocessor Report, vol. 20, Mar. 2006, pp. 1, 4, 5 and 6.

International Search Report for International Application No. PCT/US2006/044354, filed Nov. 15, 2006.

Matthew C. Merten et al., "Modulo Schedule Buffers", IEEE, Dec. 2001, pp. 138-149.

Lea Hwang Lee, et al., "Instruction Fetch Energy Reduction Using Loop Caches for Embedded Applications with Small Tight Loops", ACM, Aug. 1998, pp. 267-269.

International Search Report for PCT/US2006/044355, completed Apr. 24, 2007, mailed Dec. 14, 2007, 6 pages.

International Search Report for International Application No. PCT/US2006/44355, dated May 9, 2007, 5 pgs.

Office Communication, dated May 30, 2008, for U.S. Appl. No. 11/272,719, filed Nov. 15, 2005, 8 pages.

Office Communication, dated Mar. 31, 2008, for U.S. Appl. No. 11/272,737, filed Nov. 15, 2005, 10 pages.

Knoth, M., U.S. Appl. No. 12/421,268, filed Apr. 9, 2009, entitled "Microprocessor Having a Power-Saving Instruction Cache Way Predictor and Instruction Replacement Scheme".

Office Communication, dated Mar. 1, 2010, for U.S. Appl. No. 12/421,268, filed Apr. 9, 2009, 21 pages.

Notification of the First Office Action, for Chinese Patent Appl. No. 200680050617.8, dated Mar. 26, 2010, with translated text, 7 pages.

* cited by examiner

PROCESSOR UTILIZING A LOOP BUFFER TO REDUCE POWER CONSUMPTION

CROSS REFERENCE TO RELATED APPLICATIONS

This application is related to commonly owned, co-pending U.S. application Ser. No. 11/272,737, filed on the same date herewith, entitled "Processor Utilizing A Scratch Pad On-Demand To Reduce Power Consumption," and commonly owned, co-pending U.S. application Ser. No. 11/272,719, filed on the same date herewith, entitled "Microprocessor Having A Power-Saving Instruction Cache Way Predictor And Instruction Replacement Scheme," each of which is incorporated herein by reference in its entirety.

FIELD OF THE INVENTION

The present invention relates generally to microprocessors and reducing power consumption in microprocessors.

BACKGROUND OF THE INVENTION

An instruction fetch unit of a microprocessor is responsible for continually providing the next appropriate instruction to the execution unit of the microprocessor. A conventional instruction fetch unit typically employs a large instruction cache that is always enabled in order to provide instructions to the execution unit as quickly as possible. While conventional fetch units work for their intended purpose, they consume a significant amount of the total power of a microprocessor. This makes microprocessors having conventional fetch units undesirable and/or impractical for many applications.

What is needed is a microprocessor that offers the performance advantages of a large instruction cache while consuming less power than conventional fetch units.

BRIEF SUMMARY OF THE INVENTION

The present invention provides processing systems, apparatuses, and methods for utilizing a loop buffer to reduce power consumption.

In one embodiment, an instruction fetch unit of a processor initially provides instructions from an instruction cache to an execution unit of the processor. When instructions forming a loop are identified, they are stored in a loop buffer. The instruction cache is then disabled, and the instructions are provided to the execution unit from the loop buffer. When the loop is exited, the instruction cache is re-enabled and instructions are once again provided to the execution unit from the instruction cache.

In one embodiment, the loop buffer is disabled when not providing instructions to the execution unit to further reduce the total power consumed by the processor.

In one embodiment, components of a processor, such as the instruction cache and the loop buffer, are disabled by controlling the clock signal that is delivered to the component. By maintaining the input clock signal at either a constant high or a constant low value, state registers in the component are suspended from latching new values and the logic blocks between the state registers are placed in a stable state. Once the components are placed in a stable sate, the transistors in the state registers and the logic blocks are suspended from changing states and therefore do not consume power required to transition states.

In one embodiment, when a component is disabled to reduce power consumption, a bias voltage is applied to the component to further reduce power consumption resulting from leakage.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

The present invention provides processing systems, apparatuses, and methods for utilizing a loop buffer to reduce power consumption. In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
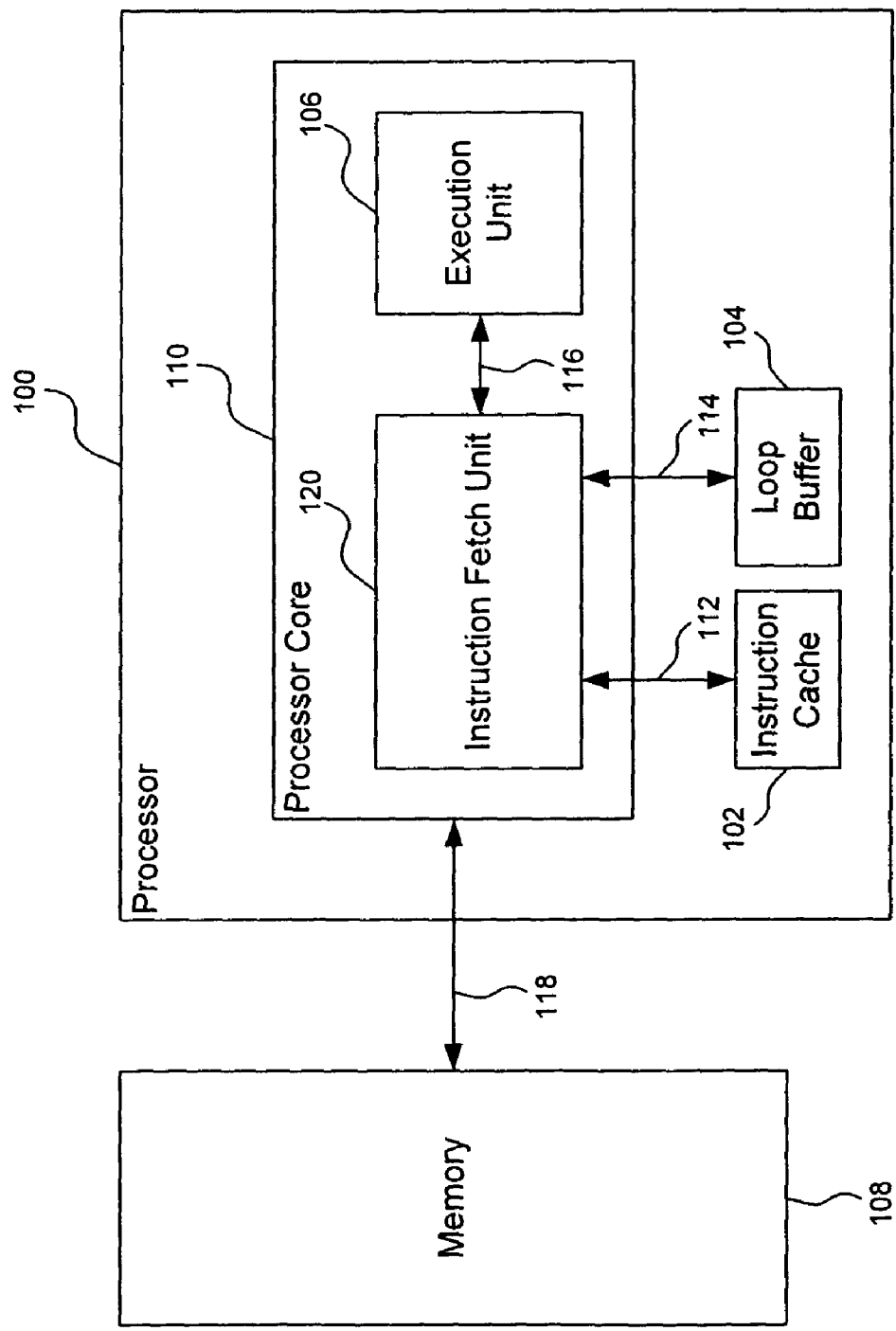
FIG. 1 is a diagram of a processor according to an embodiment of the present invention.

FIG. 1 is a diagram of a processor 100 according to an embodiment of the present invention. Processor 100 includes a processor core 110, an instruction cache 102, and a loop buffer 104. Processor core 110 includes an instruction fetch unit 120 and an execution unit 106. Instruction fetch unit 120 is responsible for retrieving instructions and providing instructions to execution unit 106 for execution. Instructions may be retrieved, for example, from a memory 108, which is external to processor 100, and may be cached in instruction cache 102. Loop buffer 104, as is explained in greater detail below, may also be used to temporarily store instructions. Instruction fetch unit 120 may provide instructions from instruction cache 102 or loop buffer 104 to execution unit 106. Instruction sources such as instruction cache 102 and loop buffer 104 may alternatively be placed within processor core 110, within instruction fetch unit 120, or external to processor 100. Instruction fetch unit 120 communicates with instruction cache 102, loop buffer 104, execution unit 106, and memory 108 through buses 112, 114, 116, and 118, respectively. As would be appreciated by those skilled in the relevant arts, memory 108 may be, for example, a level two cache, a main memory, a read only memory (ROM) or another storage device that is capable of storing instructions which are accessible to a processor.

In an embodiment, instruction fetch unit 120 provides instructions to execution unit 106 according to the conventions dictated by an instruction set architecture (ISA). Instruction fetch unit 120 provides instructions to execution unit 106 in address sequence until a branch or a jump instruction is provided. When a branch instruction is provided, instruction fetch unit 120 initially provides any delay slot instructions as required by the ISA and then provides either a branch taken or a branch not taken instruction. The branch not taken instruction is typically the next instruction in address sequence following any required delay slot instructions. The branch taken instruction may be any instruction in the instruction address space. When a jump instruction is provided, instruction fetch unit 120 initially provides any delay slot instructions as required by the ISA and then provides the target instruction of the jump instruction. The target instruction may be any instruction in the instruction address space.

Whether a branch instruction is taken or not taken is typically not determined until execution unit 106 has executed the branch instruction. Furthermore, the address of the branch taken or the jump target instruction may not be known until the branch or jump instruction is executed. In those instances, execution unit 106 provides instruction fetch unit 120 with information relating to the outcome of the branch instruction and the address of the branch taken and the jump target instruction so that instruction fetch unit 120 may provide the next appropriate instruction.

In some embodiments, rather than waiting for the outcome of the branch instruction, instruction fetch unit 120 may predict the outcome and provide instructions according to its prediction. If the prediction is later found to be incorrect by execution unit 106, care is taken to remove instructions from execution unit 106 that were provided as part of the incorrect prediction.

Branch and jump instructions are commonly used to create loops in an instruction sequence. When a branch or a jump instruction is used to form a loop, the branch taken or the jump target instruction usually occurs earlier in the instruction sequence. This allows a sequence of instructions executed earlier to be re-executed as part of a loop if the branch instruction is taken or when the jump instruction is executed. Hence, loops can be identified when a branch or jump instruction is detected having a branch taken or jump target instruction that occurs earlier in the instruction sequence. Furthermore, by computing the difference between the address of the branch taken or jump target instruction and the address of the branch or jump instruction (or the last delay slot instruction as required by the ISA), the number of instructions in the loop can be determined.

When a loop is iterated, only the sequence of instructions forming the loop is provided repeatedly to execution unit 106. Hence, while a loop is being iterated, if the sequence of instructions forming the loop is available to instruction fetch unit 120, instruction fetch unit 120 does not need to retrieve any additional instructions from memory 108. Furthermore, while the loop is being iterated, only the subset of all instructions forming the loop needs to be accessible to instruction fetch unit 120. The present invention, as explained in greater detail below, takes advantage of these observations by disabling the general mechanism of providing instructions to execution unit 106 and by utilizing a simpler mechanism which consumes less power, such as a loop buffer, to provide instructions to execution unit 106 when a loop is being iterated. For instruction sequences having many loops that are iterated numerous times, utilizing a simpler mechanism that consumes less power to provide instructions while iterating a loop can achieve substantial power savings.

Figure 2:
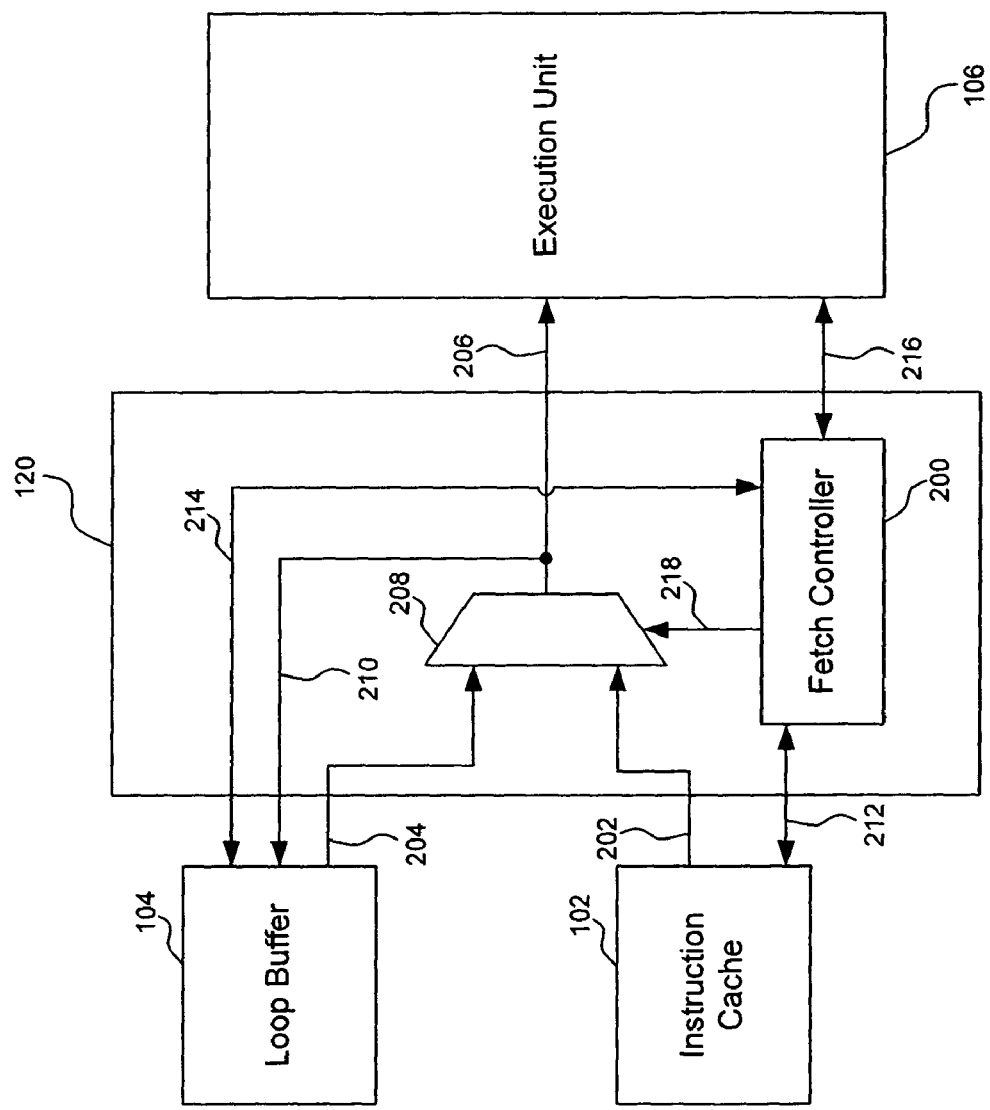
FIG. 2 is a more detailed diagram of the instruction fetch unit of FIG. 1.

FIG. 2 is a more detailed diagram of instruction fetch unit 120 according to one embodiment of the present invention. Instruction fetch unit 120 includes a fetch controller 200 and a multiplexer 208. Multiplexer 208 selects between an instruction provided on bus 202 by instruction cache 102 and an instruction provided on bus 204 by loop buffer 104 and provides the selected instruction to execution unit 106 on bus 206. The selected instruction is also provided to loop buffer 104 on bus 210 so that the selected instruction may be stored in loop buffer 104.

Fetch controller 200 communicates with multiplexer 208, loop buffer 104, instruction cache 102, and execution unit 106 through buses 218, 214, 212, and 216, respectively. For example, fetch controller 200 may receive the outcome of an executed branch instruction or the address of the branch taken or jump target instruction from execution unit 106 on bus 216. Buses 204, 210 and 214 represent components of bus 114. Buses 202 and 212 represent components of bus 112. Busses 206 and 216 represent components of bus 116.

Figure 3:
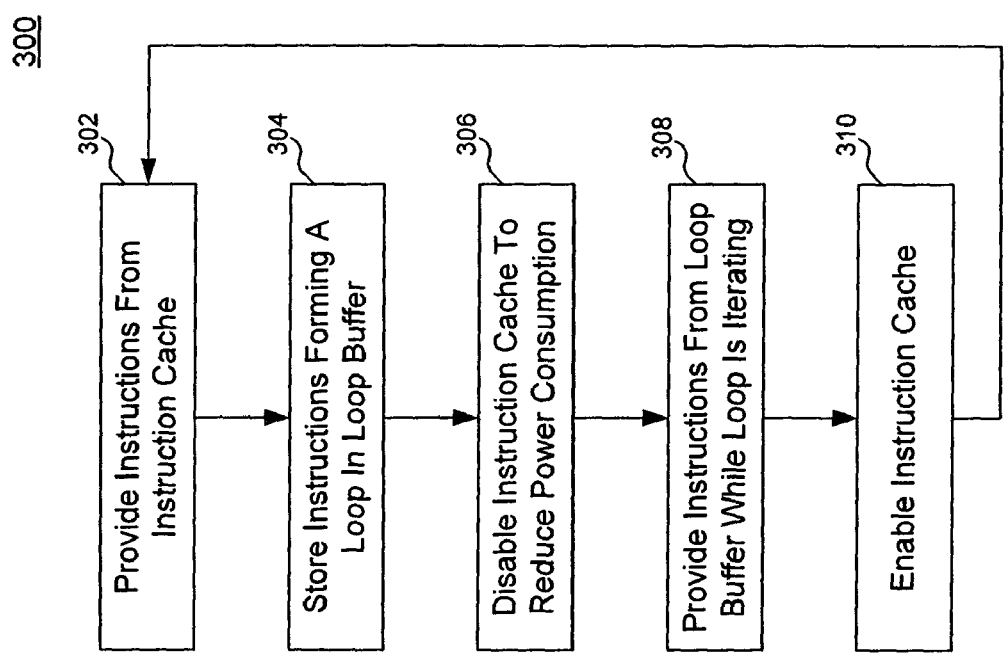
FIG. 3 is a flow chart illustrating the steps of a first method embodiment of the present invention.

FIG. 3 is a flow chart illustrating the steps of a first method 300 according to an embodiment of the present invention. The steps of method 300 can be implemented, for example, using the structure illustrated in FIGS. 1-2. Method 300 begins with step 302.

In step 302, instructions are provided from an instruction cache to an execution unit for execution. If a cache miss occurs because a required instruction is not present in the instruction cache, the cache miss is serviced before providing the required instruction to the execution unit.

In step 304, instructions forming a loop and provided to the execution unit from the instruction cache are stored in a loop buffer.

In a first embodiment, step 304 is performed by configuring the loop buffer to store each instruction that is provided by the instruction cache to the execution unit. When a branch instruction provided to the execution unit is taken or predicted to be taken and the branch taken instruction is present in the loop buffer, a loop is determined to be stored in the loop buffer. Furthermore, when a jump instruction is provided to the execution unit and the jump target instruction is present in the loop buffer, a loop is determined to be stored in the loop buffer. For ISAs that require delay slot instructions, the delay slot instructions are provided to the execution unit and stored in loop buffer before a check is made to determine if the branch taken instruction or the jump target instruction is present in the loop buffer.

In the first embodiment, the loop buffer is flushed when a branch target instruction or a jump target instruction is not present in the loop buffer and the branch target instruction or the jump target instruction is stored in the loop buffer.

In the first embodiment, the loop buffer may be advantageously implemented as a circularly indexed array of instructions with the array holding a designated number of instructions equaling a power of two (e.g., 32, 64, etc).

In a second embodiment, step 304 is performed by configuring the loop buffer to only store instructions when instructions potentially forming a loop are provided from the instruction cache to the execution unit. Initially, the loop buffer is disabled from storing instructions. When a branch instruction provided from the instruction cache to the execution unit is taken or predicted to be taken, and the branch taken instruction occurs earlier in the instruction sequence, the branch instruction is presumed to form a loop. Furthermore, when a jump instruction is provided from the instruction cache to the execution unit, and the jump target instruction occurs earlier in the instruction sequence, the jump instruction is presumed to form a loop. Once a potential loop is identified, the size of the loop is calculated (delay slot instructions are accounted for ISAs which require them) and if the potential loop is capable of fitting in the loop buffer, a loop that can be stored in the loop buffer is identified.

In the second embodiment, once a loop that can be stored in the loop buffer is identified, the loop buffer is enabled to store instructions. The branch or jump instruction that identified the loop is stored first in the loop buffer. Thereafter, instructions provided by the instruction cache to the execution unit are stored in the loop buffer. When the branch or jump instruction, which identified the loop, is provided again by the instruction cache to the execution unit, a loop is determined to have been stored in the loop buffer.

In the second embodiment, while instructions are being stored in the loop buffer, if a branch instruction other than the one which identified the loop is taken or predicted to be taken, or if a jump instruction other than the one which identified the loop is executed, the loop that was identified is presumed to have been exited and the loop buffer is flushed. The branch or jump instruction that caused the loop buffer to be flushed is then inspected to determine if it identifies a different loop that may be stored in the loop buffer.

In the second embodiment, the loop buffer does not need to be implemented as a circularly indexed array since instructions are only stored when a potential loop has been detected. Furthermore, the branch or jump instruction identifying a loop can always be stored as the first entry in the loop buffer to simplify access and comparison of the branch or jump instruction identifying the loop and subsequent branch and jump instructions that are provided by the instruction cache to the execution unit.

In a third embodiment, step 304 is performed by configuring the loop buffer to store instructions only after a special instruction indicating the presence of a loop is provided from the instruction cache to the execution unit. The special instruction may be manually inserted by a programmer or may be automatically inserted by a compiler into the instruction sequence. Once the loop buffer is enabled to store instructions, this embodiment may operate in the same manner as the first embodiment to determine if a loop has been stored in the loop buffer.

In step 306, once a loop is stored in the loop buffer, the instruction cache is disabled to reduce power consumption. In a different embodiment, when a branch instruction forms the loop stored in the loop buffer, the instruction cache is disabled only after a designated number of instructions following the branch not taken path is made available in the instruction cache. By disabling the instruction cache only after a designated number of branch not taken instructions are stored in the instruction cache, instructions may be provided to the execution unit more quickly when the loop exits at the branch instruction.

In step 308, while the loop stored in the loop buffer is being iterated, instructions are provided from the loop buffer to the execution unit.

In step 310, once the loop stored in the loop buffer is no longer being iterated, the instruction cache is re-enabled and method 300 proceeds to step 302.

In embodiments where the loop buffer is configured to selectively store instructions, the loop buffer may be disabled to reduce power consumption when the loop buffer is not storing or when the loop buffer is not providing instructions to the execution unit.

Figure 4:
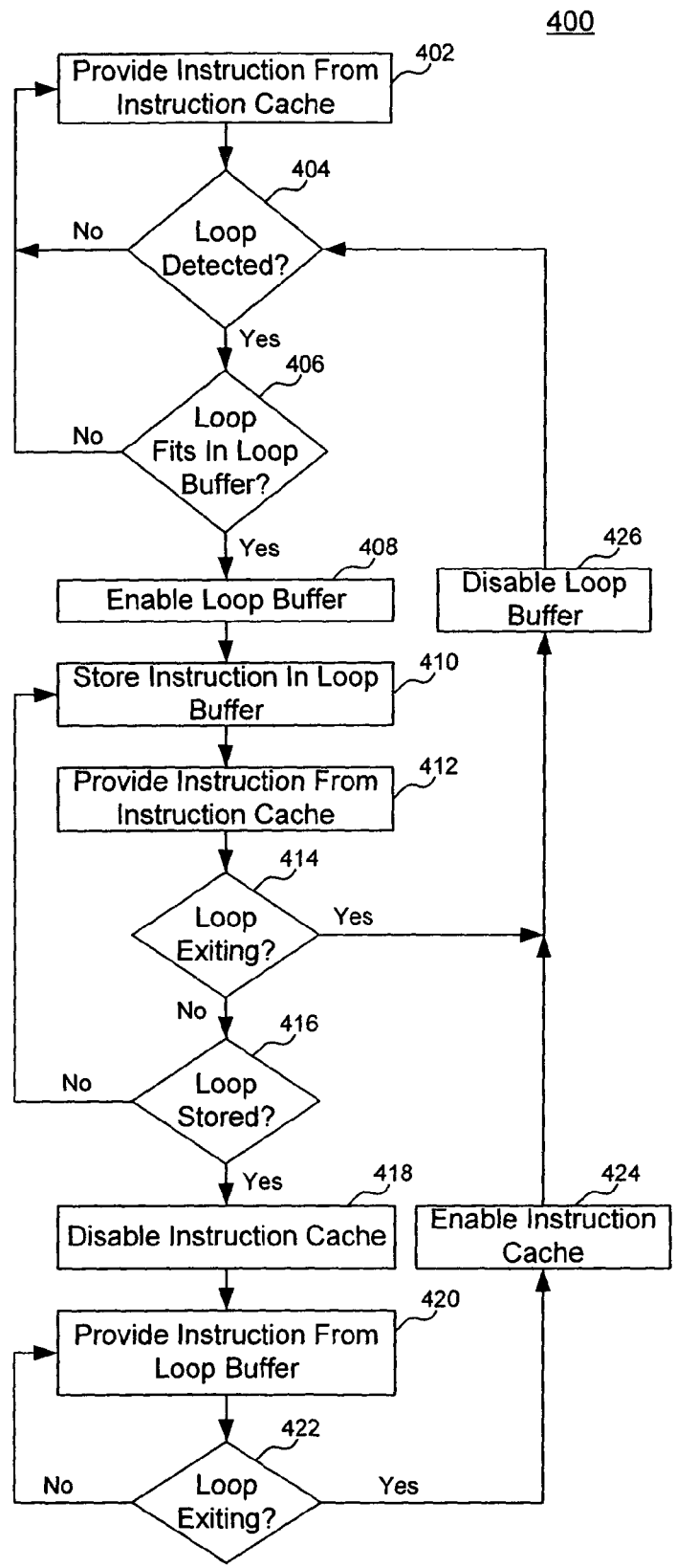
FIG. 4 is a flow chart illustrating the steps of a second method embodiment of the present invention.

FIG. 4 is a flow chart illustrating the steps of a second method 400 according to an embodiment of the present invention. The steps of method 400 can be implemented, for example, using the structure illustrated in FIGS. 1-2. Method 400 begins with step 402.

In step 402, an instruction is provided from an instruction cache to an execution unit.

In step 404, a fetch controller examines the instruction provided in step 402 to determine if the instruction identifies a potential loop. For example, if the instruction provided in step 402 is a branch instruction, and if the branch instruction is taken or predicted to be taken, and the branch taken instruction occurs earlier in the instruction sequence, the branch instruction is presumed to form a loop. In another example, if the instruction provided in step 402 is a jump instruction, and the jump target instruction occurs earlier in the instruction sequence, the jump instruction is presumed to form a loop. If the instruction provided in step 402 does not identify a potential loop, method 400 proceeds to step 402.

In step 406, once a potential loop is identified in step 404, the size of the loop is calculated (delay slot instructions are accounted for in ISAs which require them) to determine if the potential loop is capable of fitting in a loop buffer. If the potential loop cannot be stored in the loop buffer, method 400 proceeds to step 402.

In step 408, the loop buffer is enabled to store instructions of the potential loop identified in step 404.

In step 410, the instruction that was provided to the execution unit from the instruction cache is stored in the loop buffer.

In step 412, another instruction is provided from the instruction cache to the execution unit.

In step 414, the instruction provided in step 412 is examined to determine if the potential loop being stored in the loop buffer is exiting. For example, if the instruction provided in step 412 is a branch instruction other than the instruction that identified the potential loop in step 404, and if the branch instruction is taken or predicted to be taken, then the branch instruction provided in step 412 indicates that the potential loop is exiting. In another example, if the instruction provided in step 412 is a jump instruction other than the instruction that identified the potential loop in step 404, then the jump instruction indicates that the potential loop is exiting. In yet another example, if the instruction provided in step 412 is a branch or a jump instruction, and if the branch or jump instruction is the instruction which identified the loop in step 404, and if the branch taken instruction or jump target instruction is not present in the loop buffer, the instruction provided in step 412 indicates that the loop is exiting. In still yet another example, if the instruction provided in step 412 is the same branch instruction that identified the loop in step 404, and if the branch instruction is not taken or predicted to be not taken, then the branch instruction indicates that the loop is exiting.

If the instruction provided in step 412 indicates that the loop identified in step 406 is exiting, method 400 proceeds to step 426. Otherwise, method 400 continues to step 416.

In step 416, the instruction provided in step 412 is examined to determine if the loop has been completely stored in loop buffer 202. For example, if the instruction provided in step 412 is the same instruction that was used to identify the potential loop in step 404, then the loop is determined to have been stored in the loop buffer. If the loop is not determined to have been completely stored in the loop buffer, method 400 proceeds to step 410.

In step 418, once the loop is stored in the loop buffer, the instruction cache is disabled to reduce power consumption.

In step 420, an instruction is provided from the loop buffer to the execution unit.

In step 422, the instruction provided by the loop buffer in step 420 is examined to determine if the loop is exiting. The methods used in step 414 to determine if the loop is exiting are similarly used in step 422. If the loop is determined to be exiting, method 400 proceeds to step 424. Otherwise, method 400 proceeds to step 420.

In step 424, the instruction cache is re-enabled.

In step 426, the loop buffer is disabled to reduce power consumption. Method 400 proceeds to step 404 to determine if the instruction that indicated that the previously identified loop was exiting forms a new loop that may be stored in the loop buffer.

In one or more of the embodiments described herein, a component such as instruction cache 102, loop buffer 104, etc, may be disabled to reduce power consumption by controlling the input clock signal of the component. By controlling the input clock signal so that the clock is maintained at a constant high or a constant low value, state registers in the component are suspended from latching new values. As a result, logic blocks between the state registers are kept in a stable state and the transistors in the logic blocks are suspended from changing states. Hence, when the input clock signal is controlled, the transistors in the state registers and logic blocks of the component are suspended from changing states and therefore no power is required to change states. Only the power required to maintain a stable state is consumed. In another embodiment, when a component is disabled to reduce power consumption, a bias voltage is applied to the component to reduce power consumption arising from leakage.

In one embodiment, other components of the instruction fetch unit, such as a memory management unit (not shown) that is utilized only when the instruction cache is enabled, may also be disabled to reduce power consumption whenever the instruction cache is disabled.

While various embodiments of the present invention have been described above, it should be understood that they have been presented by way of example, and not limitation. It will be apparent to persons skilled in the relevant computer arts that various changes in form and detail can be made therein without departing from the spirit and scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

For example, in addition to implementations using hardware (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code, instructions and/or data disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), GDSII databases, hardware description languages (HDL) including Verilog HDL, VHDL, SystemC, SystemC Register Transfer Level (RTL), and so on, or other available programs, databases, and/or circuit (i.e., schematic) capture tools. Such software can be disposed in any known computer usable medium (computer readable storage medium) including semiconductor, magnetic disk, optical disk (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalence.

What is claimed is:

1. A hardware processor, comprising:
   an instruction source;
   a loop buffer;
   an instruction buffer; and
   a controller;
   the hardware processor being constructed and arranged such that if the controller identifies during instruction execution that a plurality of buffer instructions to be executed by the processor foams a loop, the controller:
   stores the plurality of instructions that forms the loop in the loop buffer,
   determines, based on a one of the plurality of instructions that forms the loop, whether a condition is true; and
   modifies the operation of the instruction buffer based on the determined condition.

2. The processor of claim 1, wherein the instruction source is a cache.

3. The processor of claim 1, wherein the controller is configured to disable the instruction source following execution of one of a branch instruction and a jump instruction.

4. The processor of claim 3, wherein the controller is configured to disable the instruction source after a preselected number of instructions have been stored in the loop buffer following execution of one of a branch instruction and a jump instruction.

5. The processor of claim 1, wherein the controller is configured to enable the instruction source if an instruction to be executed by the processor is not available in the instruction buffer.

6. The processor of claim 1, wherein the controller is configured to adjust a bias voltage applied to the instruction source, in response to the determined condition.

7. A method of fetching instructions in a processor having an instruction source, a loop buffer and an instruction buffer, comprising:
   providing a plurality of instructions from the instruction source to the instruction buffer;
   identifying during instruction execution, if a plurality of instructions from the instruction buffer forms a loop;
   if the plurality of instructions forms a loop, storing the plurality of instructions from the instruction buffer in the loop buffer in response to the identifying;

disabling the instruction buffer when the plurality of instructions to be executed by the processor is available from the loop buffer.

8. A tangible computer readable storage medium comprising computer readable code defining a processor, the processor comprising:

an instruction source;

a loop buffer;

an instruction buffer configured to store instructions from the instruction source; and a controller, wherein, if the controller identifies during instruction execution that a plurality of instructions to be executed by the processor forms a loop, the controller stores the plurality of instructions in the loop buffer, and the controller selectively disables the instruction buffer when the plurality of instructions are available from the loop buffer.

9. The computer readable storage medium of claim 8, wherein the controller stores the plurality of instructions in the loop buffer if the loop buffer comprises sufficient space to store the plurality of instructions.

10. The computer readable storage medium of claim 8, wherein the computer-readable code comprises hardware description language code.

11. The computer readable storage medium of claim 10, wherein the computer-readable program code is one of Verilog hardware description language code, VHDL hardware description language code, and SystemC hardware description language code.

12. A computer readable storage medium having encoded thereon computer program code for making or emulating a processor, the processor comprising:

an instruction source;

a loop buffer;

an instruction buffer configured to store instructions from the instruction source; and a controller, wherein, if the controller identifies during instruction execution that a plurality of instructions to be executed by the processor forms a loop, the controller stores the plurality of instructions in the loop buffer, and the controller selectively disables the instruction buffer when the plurality of instructions are available from the loop buffer.

13. The hardware processor of claim 1, wherein the controller selectively reduces the power consumption of the instruction buffer when the plurality of instructions is not available from the instruction buffer.

14. The method of claim 7, further comprising:

selectively reducing the power consumption of the loop buffer when no loop is identified.

15. The tangible computer readable storage medium of claim 8, wherein the controller selectively reduces the power consumption of the loop buffer when the plurality of instructions are not available from the instruction buffer.

16. The computer readable storage medium of claim 12, wherein the controller selectively reduces the power consumption of the loop buffer when the plurality of instructions is not available from the instruction buffer.

17. A processor, comprising:

a first buffer configured to store instructions, and to selectively provide instructions to an execution unit of the processor for execution;

a second buffer configured to store instructions provided from the first buffer, and to selectively provide instructions to the execution unit for execution, wherein if a plurality of instructions from the first buffer is determined to form a loop, the plurality of instructions is provided to the second buffer; and a controller configured to:

control whether instructions are provided to the execution unit from the first buffer or the second buffer;

determine during program execution that a program control instruction that directs transfer of program control to a target instruction has been taken or is predicted to be taken;

make a determination during program execution that the target instruction is present in the second buffer; wherein upon a determination that the target instruction is present in the second buffer, cause the second buffer to provide instructions to the execution unit and disable the first instruction buffer; and turn off the second buffer when the target instruction is not present in the second buffer.

18. The processor of claim 17, wherein the controller is further configured to reduce a power consumption of at least one of the first buffer or the second buffer, respectively, when instructions are not being provided from the respective buffer.

19. The hardware processor of claim 1, wherein the modification of the instruction buffer comprises disabling the instruction buffer.

20. The hardware processor of claim 1, wherein the controller modifies the operation of the instruction buffer for as long as the loop is in the loop buffer.

21. The hardware processor of claim 1, wherein the condition corresponds to the loop exiting.

* * * * *